(12) United States Patent
Audouy et al.

(10) Patent No.: US 11,437,940 B2
(45) Date of Patent: Sep. 6, 2022

(54) MECHATRONIC ASSEMBLY FOR DRIVING OR POSITIONING AN EXTERNAL MEMBER

(71) Applicant: SONCEBOZ AUTOMOTIVE SA, Sonceboz (CH)

(72) Inventors: Christophe Audouy, Sonceboz (CH); Mathieu Watrin, Sonceboz (CH)

(73) Assignee: SONCEBOZ AUTOMOTIVE SA, Sonceboz (CH)

( * ) Notice: Subject to any disclaimer, the term of this patent is extended or adjusted under 35 U.S.C. 154(b) by 0 days.

(21) Appl. No.: 17/055,704

(22) PCT Filed: May 7, 2019

(86) PCT No.: PCT/EP2019/061731
§ 371 (c)(1),
(2) Date: Nov. 16, 2020

(87) PCT Pub. No.: WO2019/219456
PCT Pub. Date: Nov. 21, 2019

(65) Prior Publication Data
US 2021/0211076 A1    Jul. 8, 2021

(30) Foreign Application Priority Data
May 17, 2018    (FR) ........................................ 1854112

(51) Int. Cl.
*H02P 6/15*    (2016.01)
(52) U.S. Cl.
CPC ..................... *H02P 6/153* (2016.02)
(58) Field of Classification Search
CPC . H02P 6/153; H02P 6/08; H02P 25/03; G05B 1/01

(Continued)

(56) References Cited

U.S. PATENT DOCUMENTS

| 3,433,924 A | 3/1969 | Sevenco |
|---|---|---|
| 5,489,831 A | 2/1996 | Harris |

(Continued)

FOREIGN PATENT DOCUMENTS

| EP | 2701300 A1 | 2/2014 |
|---|---|---|
| EP | 2932088 A2 | 10/2015 |
| GB | 2013011 A | 8/1979 |

OTHER PUBLICATIONS

U.S. Appl. No. 16/329,953, filed Mar. 1, 2019, Callerant.

*Primary Examiner* — David Luo
(74) *Attorney, Agent, or Firm* — Harness, Dickey & Pierce PLC

(57) ABSTRACT

An actuator includes a polyphased brushless motor having a two-wire connection for receiving a modulated power supply signal with a cyclic ratio or a modulated frequency, supplied by a motor control unit. The actuator also includes an electronic circuit having a microcontroller and a power stage delivering the power supply signals of the coils of the brushless motor, and a power supply stage including a rectifier and/or a filtering of the modulated signal for delivering a continuous power supply signal of the electronic circuit. The electronic circuit includes: a stage which is external or integral to the decoding microcontroller by temporal determination of the rising and falling edges of the modulated signal for providing: a direction of rotation set point value by analysis of the signal on the two wires; and/or a set point value of the target position of the rotor; and/or a set point value of a pre-recorded movement sequence; and/or a speed set point value, the microcontroller controlling the power supply signal of each of the phases according to the set point values and the power supply signal, the outputs of the power stage feeding the coils of the brushless motor.

16 Claims, 4 Drawing Sheets

(58) Field of Classification Search
USPC .............. 318/400.14, 400.13, 400.01, 700
See application file for complete search history.

(56) References Cited

U.S. PATENT DOCUMENTS

| | | | |
|---|---|---|---|
| 5,543,696 | A | 8/1996 | Huggett |
| 7,889,977 | B2 * | 2/2011 | Strike .................. H02P 7/29 |
| | | | 388/804 |
| 9,431,931 | B2 * | 8/2016 | Zhou .................... H02P 7/29 |
| 9,684,285 | B2 | 6/2017 | Rondot et al. |
| 9,712,089 | B2 * | 7/2017 | Gohara ................. H02P 3/12 |
| 9,774,279 | B1 | 9/2017 | Handion |
| 10,333,447 | B2 | 6/2019 | Price |
| 10,547,266 | B2 | 1/2020 | Callerant |
| 2004/0135534 | A1 | 7/2004 | Cullen |
| 2005/0179414 | A1 | 8/2005 | Tani |
| 2011/0115416 | A1 | 5/2011 | Oh |
| 2015/0323908 | A1 | 11/2015 | Rondot et al. |
| 2016/0156294 | A1 | 6/2016 | Heo |
| 2016/0369855 | A1 | 12/2016 | Essenmacher |
| 2017/0331409 | A1 | 11/2017 | Andrieux et al. |

* cited by examiner

MECHATRONIC ASSEMBLY FOR DRIVING OR POSITIONING AN EXTERNAL MEMBER

CROSS-REFERENCE TO RELATED APPLICATIONS

This application is a National Phase entry of PCT/EP2019/061731 filed on May 7, 2019, which claims priority to French application No. 18/54112 filed on May 17, 2018, both of which are incorporated by reference herein.

TECHNICAL FIELD

The present invention relates to the field of mechatronics and particularly to actuators comprising a brushless motor. It proposes the possible replacement of a motor having brushes by a brushless motor in a certain application, without modifying the control architecture and while improving the current solutions.

A motor with brushes operating at a constant speed requires only a DC voltage and an on/off switch. The speed is changed over a wide range by changing the voltage. In the case of automotive applications using such motors, it is known to use an electronic control unit (ECU) having an architecture such as a so-called "H-bridge" consisting of two pairs of transistors that control the passage of current in one direction or the other, which makes it possible to obtain a bipolar current (negative and positive) and thus bidirectional motion.

A signal modulated by Pulse Width Modulation (PWM), which is used to generate a medium voltage with modulation by a rectangular signal taking primary values (generally by 0 volt switching at the battery voltage, usually 12V), is employed in a known and usual manner to control the speed of these motors. The motor winding acts like a low-pass filter by way of its resistance and its inductance, which allows a high frequency PWM wave form to generate an almost constant current in the winding. To regulate the speed more precisely, it is possible to add a speed sensor, for example a Hall effect sensor or an optical coder, so as to constitute a closed circuit control device.

The change to a brushless motor is advantageous if one wishes to particularly improve the lifetime of the motor and its resulting performance. It is then desirable to have the capability to supply the motor with power and control by means of this simple existing ECU architecture.

BACKGROUND

European Patent No. 2932088, which makes it possible to replace a motor having a brush by a brushless motor, i.e. without modifying existing ECU architecture in this case (i.e. without changing anything else), is known from the state of the art. The solution that is offered proposes to control the transistors directly through a signal from sensors on the rotor, via a simple electronic circuit without a microcontroller. U.S. Pat. No. 9,774,279 describes a system for controlling the movement of an actuator comprising a power supply input, which provides a PWM signal, a motor control circuit, which receives the PWM signal and issues a synthesized three-phase control signal, a brushless DC motor, which receives the control signal and operates to reposition the actuator in response to the received control signal, and a controller which receives the PWM signal, is also known. The controller comprises an amplitude detection module, which detects the amplitude of the PWM signal, and a detection and control module, which detects the polarity of the PWM signal.

The solution disclosed in European Patent No. 2932088 is not always satisfactory if one wishes to obtain optimal performance of the motor. In fact, the simple architecture without a microcontroller, as well as the simple logic tables that are described, lead to an operation of the motor with a current and thus a torque that is not quite constant; the output of the motor is thus affected. Also, if one wishes to add diagnostic or shutdown functions when critical conditions are reached (high temperature, a mechanical stop) this kind of control cannot carry them out. As well, if one wishes to control the motor by means of a PWM signal having different characteristics (e.g. in terms of frequency), this electronic architecture does not allow for it.

The solution disclosed in U.S. Pat. No. 9,774,279 allows an a priori improvement by the addition of a microcontroller, but the description it provides is vague and the disclosed solution is not particularly satisfactory. In fact, the brushless motor is controlled by means of the amplitude of the PWM signal generated by an ECU. But, the amplitude of the PWM signal is subject to impairments such as variation of the supply voltage provided by the battery, transient voltage pulses, as well as electromagnetic interferences coming from electric machinery or components located in the vicinity of connecting wires or electronic circuits. These impairments then distort the signal detected by the electronic control circuit and the brushless DC motor (BLDC) is not controlled in a satisfactory manner. To mitigate these disadvantages, the prior art solution proposes reconstruction of the rectangular signal by digital processing, an operation that consumes considerable calculational resources and incurs additional power consumption. It is moreover not clear in this patent whether the signal supplied to the motor is a two-wire signal or not.

SUMMARY

It is the object of the present invention to suggest a solution for the aforesaid problems by proposing an actuator with an integrated electronic circuit, which can be used instead of a motor with a brush, which is not sensitive to variations in voltage amplitude and makes it possible to optimize the operation of the electric motor. More particularly, the invention relates to an actuator comprising a polyphased brushless motor having a two-wire connection for receiving a modulated power supply signal with a cyclic ratio or a modulated frequency, supplied by a motor control unit, said actuator also comprising an electronic circuit comprising a microcontroller and a power stage delivering the power supply signals of the coils of said brushless motor, and a power stage comprising a rectifier and/or a filtering of said modulated signal to deliver a continuous supply signal of the electronic circuit, characterized in that said electronic circuit comprises:
  a stage, which is external or integrated in the decoding microcontroller by temporal determination of the rising and falling edges of the aforesaid modulated signal so as to provide:
    the direction of rotation setpoint by analysis of the signal applied to said two wires, and/or
    a setpoint for the target position of the rotor and/or
    a setpoint for a sequence of prerecorded motions, and/or
    speed setpoint, said microcontroller controlling the power supply signal of each phase, depending on the aforesaid power supply instructions and the aforesaid signal, with the outputs of said power supply stage powering the coils of the brushless motor.

Said power supply stage preferably comprises 2N field-effect transistors (MOSFET), where N is the number of phases of said brushless motor. In a preferred embodiment, the detection of the rising/falling edges is accomplished by determining when an input signal crosses a threshold value corresponding to an intermediate value between the high level and the low level of the modulated signal. For example, the detection of rising/falling edges is performed by determining when an input signal crosses a rising threshold value between 20 and 45% below the nominal amplitude, and when the input signal crosses a falling threshold value between 55 and 80% above the normal amplitude.

In an optional but nonrestrictive way, the motor actuates a position encoder whose output is connected to the electronic control unit, or it is possible for the microcontroller to simulate a position signal that is transmitted to the electronic control unit. In an alternative embodiment, the microcontroller performs a measurement of the cyclic ratio of the modulated signal so as to interpret the position command depending on said cyclic ratio. In another alternative embodiment, the microcontroller performs a measurement of the frequency of the modulated signal so as to interpret the position command depending on said frequency.

Further areas of applicability will become apparent from the description provided herein. The description and specific examples in this summary are intended for purposes of illustration only and are not intended to limit the scope of the present disclosure.

DRAWINGS

The present invention will be elucidated by reading the following detailed description of a nonrestrictive example of the invention, which refers to the attached drawings, where:

DETAILED DESCRIPTION

Figure 1:
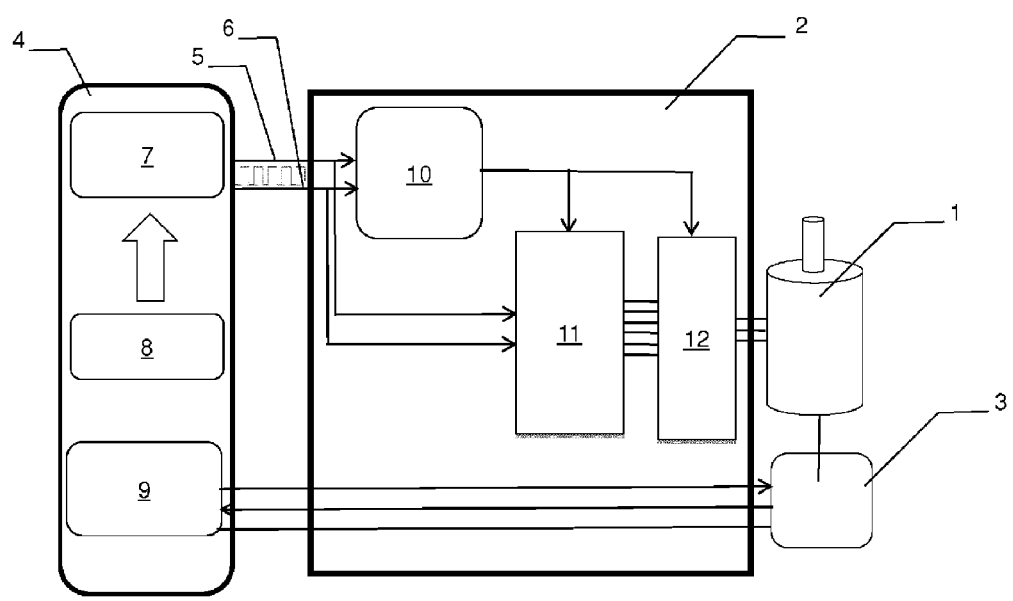
FIG. 1 represents a general diagram of a first embodiment of an actuator according to the invention.

FIG. 1 represents an example embodiment of an actuator comprising a brushless motor (1) associated with an electronic circuit (2) and with an absolute position encoder (3), the latter being optional for the implementation of the invention. This actuator receives signals from an electronic control unit ECU (4) consisting of an electronic computer and on-board software, which controls a motor by means of modulated PWM signals, transmitted over two wires (5, 6).

The electronic control unit is usually configured to control a motor with a brush, which is associated with a position feedback sensor to provide position control. It usually comprises an H-bridge (7), which serves the purpose of controlling the polarity of the output signal at the terminals (5, 6), with this signal including information on power, torque or speed and direction. The H-bridge (7) makes it possible to fulfill 2 functions, which are to reverse the direction of rotation of the motor by reversing the current at the motor terminals and changing the speed of the motor by modulating the voltage at the motor terminals.

The H-bridge (7) receives information from a PID regulator (8), which provides closed loop servo-control depending the data coming from a circuit (9) that processes the data coming from the encoder (3). The closed loop servo-control deriving from the information from the encoder is not imperative in the present invention and is provided here for information only. It is also specified that the invention does not relate to the electronic power control unit (4).

The electronic circuit (2) comprises an input with two terminals (5, 6) connected to the electronic power control unit (4) via a two-wire connection, transporting an electric power current modulated in terms of the width of the pulses. The electronic circuit (2) does not comprise a terminal for supplying additional power, so that the two-wire signal comprises information about the direction (i.e. the direction of rotation of the motor), the torque or the speed (i.e. the speed at which the motor must turn) and the power (the signal transports the electric power that is applied to the motor phases). This two-wire signal (5, 6) is, on the one hand, transmitted to a supply stage (10) and, on the other hand, to a microcontroller (11). The supply stage (10) comprises a rectifier and/or filtering in order to deliver a continuous power supply signal to the microcontroller (11) and a power stage (12).

The microcontroller (11) performs the analysis of PWM signals transmitted over two wires (5, 6) so as to detect rising voltage edges and the falling voltage edges, and it calculates:
 a rotational direction setpoint by analyzing the signal from said two wires (5, 6), and/or
 a setpoint for the target position of the rotor and/or
 a setpoint for a sequence of prerecorded movements, and/or
 a speed setpoint.

Figure 2:
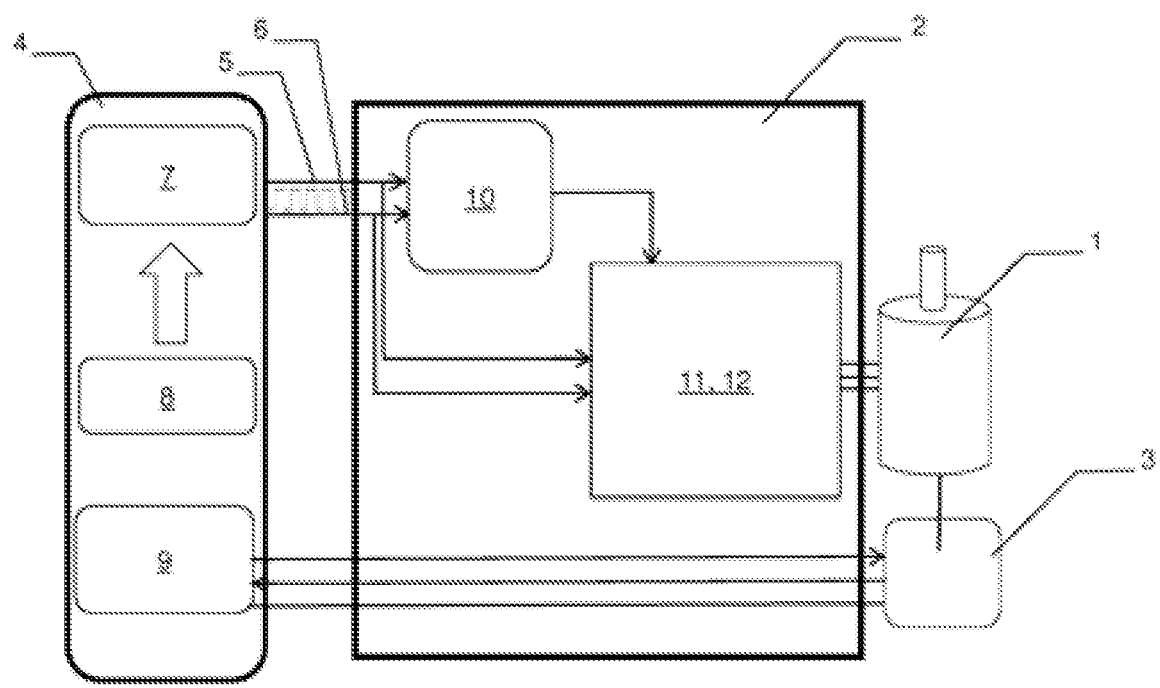
FIG. 2 represents a general diagram of a second embodiment of an actuator according to the invention.

The output of the microcontroller (11) controls the opening and the closing of the power stage (12) according to the instructions. The power stage (12) comprises 2N transistors, where N is the number of electric phases of the motor (1). It is specified that the power stage (12) can be integrated into the microcontroller (11), for example when the motor output is relatively low (typically lower than 15 W), as shown in FIG. 2.

Interpretation of the Position Control

The actuator uses the PWM power signal coming from the ECU unit (4) to supply the microprocessor (11) and the power stage (12) as described above. The power stage (12) delivers the rectified supply signal, which is rectified and/or filtered by the supply stage (10), to each phase of said brushless motor so as to control various operating processes of the motor. According to a first embodiment, a measurement of the cyclic ratio of the PWM is performed so as to interpret the position command. The cyclic ratio of the pulse width modulation is then coded to control various operating processes, for example:
 The calibration position for a cyclic ratio of 85%,
 The calibration position for a cyclic ratio of 90%,
 The calibration position for a cyclic ratio of 95%.

Intermediate positions or additional commands can be added by selecting other cyclic ratios. In this embodiment, provided as an example, the microcontroller is configured so as to interpret the cyclic ratio of the PWM signal.

According to a second embodiment, a measurement of the PWM frequency is performed to interpret the position command. The pulse width modulation frequency is then coded to control various operating processes, for example:

The closed position for a PWM signal of 18 Khz,
The calibration position for a signal of 20 Khz,
The open position for a PWM signal of 22 Khz.

Intermediate positions or additional commands can be added by selecting other frequencies. In this embodiment, provided as an example, the microcontroller is configured so as to interpret the frequency of the PWM signal. The supply stage (10) is used to filter and possibly rectify the signal (5, 6) in order to supply the power stage (12) directly (without additional processing). The PWM frequency and the cyclic ratio (90% for example) are large enough to allow the supply signal to be filtered by using a low value capacitor (typically lower than 220 μF).

Additional processing allowed by the microcontroller

With the actuator integrating a microcontroller (11), it is possible to perform additional functionalities actuated by a data-processing code, such as:

the return to a reference position in the event of failure,
the arrival at a low stop speed,
steering the rate of travel of the rotor depending on the position,
control of the current depending on temperature conditions,
the minimization of consumption,
stopping the motor control when temperature or current peaks are reached.

Figure 3:
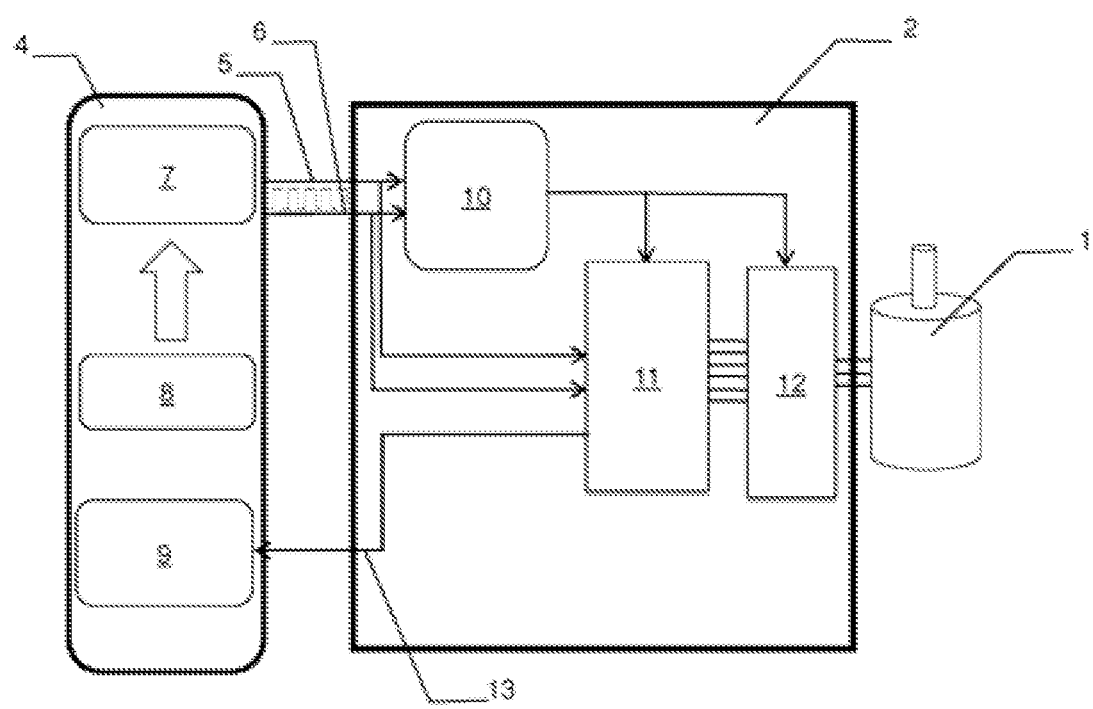
FIG. 3 represents a general diagram of a third embodiment of an actuator according to the invention.

According to an alternative embodiment, the motor (1) does not comprise a position encoder (3), as shown in FIG. 3. In this case, the position signal is simulated by the microprocessor (11) and the information feedback is accomplished via a dedicated line (13).

The simulation of the sensor is, for example, performed by determining the position at the time of a search for the stop in the application. The position can thus be determined by counting the number of motor steps performed as of these stops. The information feedback is typically performed by a signal of the PWM type, which is transmitted by the microcontroller (11) and which can code the kind of information, for example, by means of an PWM frequency or a particular cyclic ratio. The different kinds of information that can be transmitted are then, for instance, the achievement of a given temperature, positioning error, mechanical error, abnormal consumption of current, etc.

Figure 4:
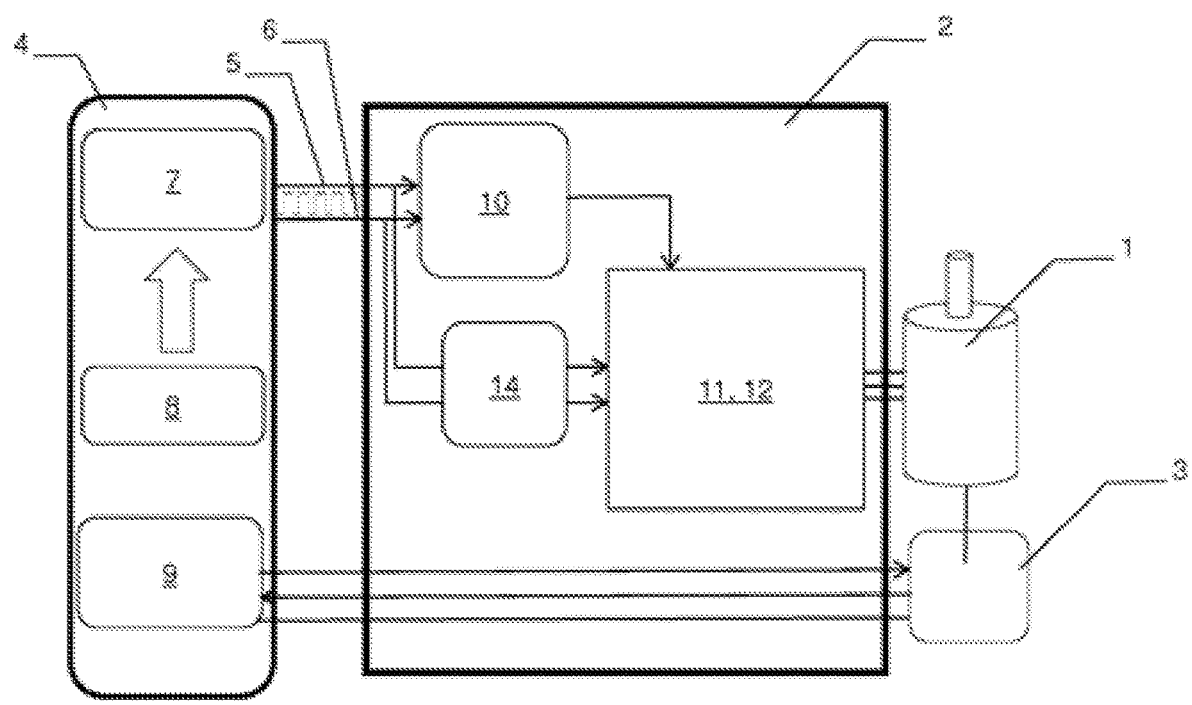
FIG. 4 represents a general diagram of a third embodiment of an actuator according to the invention.

FIG. 4 shows a general diagram of a fourth embodiment of an actuator according to the invention. In this embodiment, the microcontroller (11) comprises the power stage (12) but does not comprise the decoding stage (14) which is externalized. This alternative can be of interest when the decoding function, particularly including a filter of the two-wire input signal, cannot be taken over by the microcontroller, for example when the voltage levels to be controlled are too high. It is also possible to consider an embodiment where various elements: the decoding stage (14), the microcontroller (11) and the power stage (12), are three separate elements.

The invention claimed is:

1. An actuator comprising a polyphase brushless motor including a two-wire connection operably receiving a power supply signal with a cyclic ratio or a modulated frequency, supplied by a motor control unit, the actuator also comprising an electronic circuit including a microcontroller, a power stage, and a power supply stage comprising a rectifier and/or a filtering of a modulated signal configured to deliver a continuous power signal to the microcontroller and to the power stage of the electronic circuit, the electronic circuit including a decoding stage that is external to or integrated in the microcontroller by temporal determination of rising edges and falling edges of the modulated signal so as to provide a decoded signal corresponding to (a) a direction of rotation setpoint by analyzing the modulated signal on the two wires, and/or
(b) a target rotor position setpoint, and/or
(c) a target sequence of prerecorded motions, and/or
(d) a target speed;
the microcontroller controlling the power stage depending on the decoded signal and the continuous power supply signal, with the outputs from the power stage, powering coils of the brushless motor.

2. The actuator according to claim 1, wherein the power stage comprises 2N field-effect MOSFET transistors, where N is a number of phases of the brushless motor.

3. The actuator according to claim 1, wherein the detection of the rising/falling edges is performed by determining a crossing of a threshold value corresponding to an intermediate level between a high level and a low level of the modulated signal by an input signal.

4. The actuator according to claim 1, wherein the detection of the rising/falling edges is performed by determining upward crossing by an input signal of a first threshold value corresponding to a level between 20 and 45% of a nominal amplitude, and of a downward crossing by an input signal of a second threshold value corresponding to a level between 55 and 80% of the nominal amplitude.

5. The actuator according to claim 1, wherein the motor comprises a position encoder whose output is connected to the control unit.

6. The actuator according to claim 1, wherein the microcontroller simulates a position signal that is transmitted to the control unit.

7. The actuator according to claim 1, wherein the microcontroller performs a measurement of a cyclic ratio of a modulated signal so as to interpret a position command as a function of the cyclic ratio.

8. The actuator according to claim 1, wherein the microcontroller performs a measurement of the frequency of a modulated signal so as to interpret a position command according to the frequency.

9. An actuator comprising:

an electronic control unit generating a power supply signal with a cyclic ratio or a modulated frequency that is coded to correspond to one or more of a plurality of operating processes;
a polyphase brushless motor;
an electronic circuit coupled to the electronic control circuit through a two-wire connection, the electronic circuit receiving the power supply signal, the electronic circuit including a microcontroller, a power stage, and a power supply stage comprising a rectifier or a filter, or both, said power supply stage configured to deliver a continuous power signal to the microcontroller and to the power stage of the electronic circuit;
the electronic circuit including a decoding stage that is external to or integrated in the microcontroller, the decoding stage temporally determine based on the rising edges and falling edges of the modulated signal the one or more of the operating processes of
(a) a direction of rotation setpoint by analyzing the modulated signal on the two wires, and/or
(b) a target rotor position setpoint, and/or
(c) a target sequence of prerecorded motions, and/or
(d) a target speed;

the microcontroller controlling the power stage depending on the one or more operating processes and the continuous power signal, with the outputs from the power stage, powering coils of the brushless motor.

10. The actuator according to claim 9, wherein the power stage comprises 2N field-effect MOSFET transistors, where N is a number of phases of the brushless motor.

11. The actuator according to claim 9, wherein the detection of the rising/falling edges is performed by determining a crossing of a threshold value corresponding to an intermediate level between a high level and a low level of the modulated signal by an input signal.

12. The actuator according to claim 9, wherein the detection of the rising/falling edges is performed by determining upward crossing by an input signal of a first threshold value corresponding to a level between 20 and 45% of a nominal amplitude, and of a downward crossing by an input signal of a second threshold value corresponding to a level between 55 and 80% of the nominal amplitude.

13. The actuator according to claim 9, wherein the motor comprises a position encoder whose output is connected to the control unit.

14. The actuator according to claim 9, wherein the microcontroller simulates a position signal that is transmitted to the control unit.

15. The actuator according to claim 9, wherein the microcontroller performs a measurement of a cyclic ratio of a modulated signal so as to interpret a position command as a function of the cyclic ratio.

16. The actuator according to claim 9, wherein the microcontroller performs a measurement of the frequency of a modulated signal so as to interpret a position command according to the frequency.

* * * * *